(12) United States Patent
Yukio et al.

(10) Patent No.: US 6,221,995 B1
(45) Date of Patent: Apr. 24, 2001

(54) MODIFIED POLYISOCYANATE AND PRODUCTION PROCESS THEREOF

(75) Inventors: Tominaga Yukio; Tsuchida Atsuko; Shiraki Hiroyuki, all of Osaka (JP)

(73) Assignee: Takeda Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/300,842

(22) Filed: Apr. 28, 1999

(30) Foreign Application Priority Data

Apr. 30, 1998 (JP) .................................................. 10-120767

(51) Int. Cl.$^7$ ............................ C08G 77/28; C08G 77/14
(52) U.S. Cl. .................................. 528/28; 528/29; 528/30; 528/76; 528/79
(58) Field of Search .................................. 528/76, 79, 28, 528/29, 30

(56) References Cited

U.S. PATENT DOCUMENTS

| | | | |
|---|---|---|---|
| 4,567,228 | * 1/1986 | Gaa et al. | 524/588 |
| 4,663,377 | 5/1987 | Hombach et al. | 524/196 |
| 4,830,916 | * 5/1989 | Fukuda et al. | 428/138 |
| 5,252,696 | 10/1993 | Laas et al. | 528/49 |
| 5,468,804 | 11/1995 | Schmalstieg et al. | 524/591 |

FOREIGN PATENT DOCUMENTS

| | | |
|---|---|---|
| 29 03 022 | 7/1980 | (DE) . |
| 0 498 442 | 8/1992 | (EP) . |
| 0 557 844 A1 | 9/1993 | (EP) . |
| 4-15270 | 3/1992 | (JP) . |
| 5-222150 | 8/1993 | (JP) . |
| 6-17004 | 1/1994 | (JP) . |
| 7-109327 | 4/1995 | (JP) . |
| 9-137146 | 5/1997 | (JP) . |

OTHER PUBLICATIONS

Abstract JP 61201084, Sep. 1986.*
Abstract JP 09048834, Feb. 1997.*
Abstract JP 61266679, Sep. 1986.*
Derwent Abstract of DE 2903022 (Abstract No. 1980–55388C).

* cited by examiner

Primary Examiner—Margaret G. Moore
(74) Attorney, Agent, or Firm—Wenderoth, Lind & Ponack, L.L.P.

(57) ABSTRACT

A modified polyisocyanate which has a high emulsifying/dispersing ability in aqueous resin compositions (solution or dispersion) and can be used advantageously as a curing agent or cross-linking agentis disclosed. The modified polyisocyanate is comprised of a reaction product of a polyisocyanate (an aliphatic or alicyclic polyisocyanate such as 1,6-diisocyanate hexane or a derivative thereof) with one of the following components (1) to (3):

(1) a nonionic emulsifying agent which contains active hydrogen atoms reactive with isocyanate group, has a hydrophile-lipophile balance (HLB) value of 17 or less and contains 15 to 35 in average of ethylene oxide units in one molecule, (2) a polyoxyalkylene alkylaryl ether which contains active hydrogen atoms, has an HLB value of from 5 to 17 and contains ethylene oxide unit and (3) a nonionic emulsifying agent which contains active hydrogen atoms and a coupling agent (e.g., a mercapto group-containing silane coupling agent) which contains active hydrogen atoms and has a hydrolysis condensing group.

12 Claims, No Drawings

MODIFIED POLYISOCYANATE AND PRODUCTION PROCESS THEREOF

BACKGROUND OF THE INVENTION

1. Field of the Invention

This invention relates to a nonionic modified polyisocyanate (or a polyisocyanate mixture) which has isocyanate groups and has been modified to be hydrophilic. More particularly, it relates to a modified polyisocyanate which can be used advantageously as a curing agent for aqueous resin compositions (e.g., paints, printing inks and adhesives).

2. Description of the Related Art

Modified polyisocyanates have been proposed for the purpose of producing an aqueous two-component polyurethane resin by emulsifying a water-soluble or water-dispersible polyisocyanate into an aqueous polymer solution or aqueous polymer dispersion. For example, JP-A-6-17004 discloses an aqueous coating composition which comprises a mixture of a polyol component comprising an olefin polymer having a hydroxyl group, etc. (a binder) with a polyisocyanate component in which the polyether chain has 5 to 70 in average of ethylene oxide units (the term "JP-A" as used herein means an "unexamined published Japanese patent application"). JP-A-7-109327 discloses a water-dispersible or water-soluble polyisocyanate composition obtained by allowing a monohydric or polyhydric alcohol to react with tolylene diisocyanate, in which at least 70 mol % of 7 to 25 in average alkylene oxide units are ethylene oxide units.

JP-B-4-15270 discloses an adhesive composition which comprises a water dispersion of a water-soluble polymer and an aqueous emulsion and a terminal isocyanate group-containing auto-emulsifying prepolymer which is obtained by allowing an isocyanurate ring-containing hexamethylene diisocyanate polymer to react with an alkoxy polyalkylene glycol having a molecular weight of from 250 to 4,000 (the term "JP-B" as used herein means an "examined Japanese patent application").

JP-B-7-30160 and JP-A-9-137146 disclose a water-dispersible polyisocyanate preparation having an average NCO functionality of from 2 to 3.5, as an additive agent for use in aqueous adhesives which use a polymer dispersed in water as the base. In these references, a reaction product of an aliphatic polyisocyanate with a nonionic polyalkylene ether alcohol which contains at least one polyether chain having at least 10 ethylene oxide units is disclosed as the above-described polyisocyanate preparation, and phenol as well as methanol are described as the alcohol for the production of the polyether alcohol. In this connection, HLB of the nonionic polyalkylene ether alcohol, when phenol is used as a starter, is about 18 or more.

JP-A-5-222150 describes that a polyisocyanate mixture is obtained by allowing a polyisocyanate component to react with a polyalkylene oxide polyether having 5 to 99 in average of ethylene oxide units and that a monohydric alcohol having a molecular weight of from 32 to 150 (particularly methanol) can be used as a starter for obtaining the polyether alcohol.

These polyisocyanates (auto-emulsifying polyisocyanates) can improve emulsifying ability in water. However, since they have small emulsifying and dispersing abilities in aqueous polymer solutions and aqueous polymer dispersions, emulsification of the polyisocyanates (auto-emulsifying polyisocyanates) requires a high shearing force by a mixer, etc. or requires a prolonged period of mixing time when the shearing force is low. Because of their small emulsifying and dispersing abilities, these polyisocyanates do not emulsify or disperse uniformly when added to an aqueous resin composition and they are partially crystallized or precipitated, so that isocyanate cannot be used effectively as a curing agent or cross-linking agent. In addition, when they are used as a curing agent for aqueous paints, transparency and uniformity of the resulting coats are also reduced due to decreased emulsifying and dispersing abilities.

In view of the above, an object of the present invention is to provide a modified organic polyisocyanate which shows high emulsifying and dispersing abilities in aqueous polymer solutions or aqueous polymer dispersions even if it has low emulsifying ability in water itself and can be emulsified therein within a short period of time even under a low shearing force, as well as to a process for producing the same.

Another object of the present invention is to provide a modified polyisocyanate which can be used effectively as a curing agent and a cross-linking agent for aqueous resin compositions (e.g., paints, printing inks and adhesives), and a process for producing the same.

SUMMARY OF THE INVENTION

With the aim of achieving the above-described objects, the inventors of the present invention have conducted extensive studies and, as a result, found of the efforts that emulsifying and dispersing abilities in aqueous polymers (aqueous polymer solutions and dispersions) can be markedly improved when a particular nonionic emulsifying agent is allowed to react with a polyisocyanate, thus resulting in the accomplishment of the present invention.

Accordingly, the modified polyisocyanate of the present invention is comprised of a reaction product of a polyisocyanate with (1) a nonionic emulsifying agent which contains an active hydrogen atom reactive with isocyanate group, has a hydrophile-lipophile balance (HLB) value of 17 or less and contains 15 to 35 in average of ethylene oxide units in one molecule, (2) a polyoxyalkylene alkylaryl ether which contains an active hydrogen atom reactive with isocyanate group, has an HLB value of from 5 to 17 and contains ethylene oxide unit or (3) a nonionic emulsifying agent which contains an active hydrogen atom reactive with isocyanate group and a coupling agent which contains an active hydrogen atom reactive with isocyanate group and has a hydrolysis condensing group. As the polyisocyanate, an aliphatic or alicyclic polyisocyanate or a derivative thereof (for example, 1,6-diisocyanatohexane or a derivative derived therefrom (e.g., a polyisocyanate having isocyanurate group)) is generally used. Examples of the coupling agent include silane coupling agents (e.g., a silane coupling agent having a mercapto group).

DESCRIPTION OF THE PREFERRED EMBODIMENTS

The modified polyisocyanate can be produced by allowing the aforementioned polyisocyanate to react with any one of the aforementioned components (1) to (3).

In this connection, the term "modified polyisocyanate" as used herein means a product of the reaction of at least a polyisocyanate and a nonionic emulsifying agent and is synonymous with a "modified polyisocyanate mixture" or a "dispersible (or auto-emulsifiable) modified polyisocyanate".

The modified polyisocyanate mixture of the present invention is a reaction product in which active hydrogen atoms of an emulsifying agent, capable of reacting with isocyanate group, have been reacted with isocyanate group of a polyisocyanate at a certain ratio.

Polyisocyanate

As the aforementioned polyisocyanate, mainly an aliphatic polyisocyanate and/or an alicyclic polyisocyanate (particularly, diisocyanate) and polyisocyanate derivatives thereof can be used generally.

Examples of the aliphatic polyisocyanate include diisocyanates (e.g., trimethylene diisocyanate, tetramethylene diisocyanate, 1,6-diisocyanatohexane (hexamethylene diisocyanate, HDI), pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6-diisocyanatomethylcaproate) and polyisocyanates (e.g., lysine ester triisocyanate, 1,4,8-triisocyanatooctane, 1,6,11-triisocyanatoundecane, 1,8-diisocyanato-4-isocyanatomethyl-octane, 1,3,6-triisocyanatohexane and 2,5,7-trimethyl-1,8-diisocyanato-5-isocyanatomethyloctane).

Examples of the alicyclic polyisocyanate include diisocyanates (e.g., 1,3-cyclopentene diisocyanate, 1,4-cyclohexane diisocyanate, 1,3-cyclohexane diisocyanate, 1-isocyanato-3,3,5-trimethyl-5-isocyanatomethyl-cyclohexane (isophorone diisocyanate, IPDI), 4,4'-methylenebis(cyclohexyl isocyanate), methyl-2,4-cyclohexane diisocyanate, methyl-2,6-cyclohexane diisocyanate and 1,3- or 1,4-bis(isocyanatomethyl) cyclohexane) and polyisocyanates (e.g., 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1) heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1) heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane).

These polyisocyanates may be used alone or as a mixture of two or more.

Preferred examples of the polyisocyanate include aliphatic diisocyanates such as HDI (e.g., $C_{4-10}$ alkylene diisocyanate) and alicyclic diisocyanates such as IPDI, 1,3- or 1,4-bis(isocyanatomethyl)cyclohexane or the like (particularly, IPDI).

Also useful are derivatives of polyisocyanate, such as a dimer, a trimer (an isocyanurate group-containing polyisocyanate), a biuret group-containing polyisocyanate, an allophanate group-containing polyisocyanate and an oxadiazinetrione group-containing polyisocyanate, etc. These derivatives may also be used alone or as a mixture thereof, or in combination with the aforementioned aliphatic or alicyclic polyisocyanate.

Preferred among these derivatives are HDI and/or IPDI-based derivatives, particularly an isocyanurate group-containing polyisocyanate and an allophanate group-containing polyisocyanate.

The isocyanate group content of polyisocyanate derivatives can be selected optionally but is generally from about 12 to 40% by weight, preferably from about 15 to 35% by weight, based on the whole polyisocyanate to be used.

In addition, it is desirable that the polyisocyanate is a polyisocyanate capable of forming a modified polyisocyanate (reaction product) which is a fluid liquid (including viscous liquid) at room temperature (15 to 30° C.). Examples of such a type of polyisocyanate include the aforementioned aliphatic or alicyclic polyisocyanates (particularly, HDI and IPDI), isocyanurate group-containing polyisocyanates (particularly trimers of HDI and/or IPDI) and allophanate group-containing polyisocyanates (particularly allophanate group-containing polyisocyanates derived from HDI and/or IPDI).

Nonionic emulsifying agent

The aforementioned emulsifying agent having an active hydrogen atom reactive with isocyanate group of the polyisocyanate is nonionic. Examples of the active hydrogen atom-containing reactive group of such a nonionic emulsifying agent include a hydroxyl group and a mercapto group, of which a hydroxyl group is particularly preferred. As the nonionic emulsifying agent, a polyoxyalkylene-based emulsifying agent having at least oxyethylene unit, particularly a polyoxyethylene-based emulsifying agent having a hydroxyl group, is generally used. Examples of the oxyalkylene unit of the polyoxyalkylene-based emulsifying agent include $C_{2-5}$ alkylene oxide units such as oxyethylene, oxypropylene and oxybutylene, and these oxyalkylene units may contain at least oxyethylene unit or may be random or block copolymer units of oxyethylene unit and oxy-$C_{3-5}$ alkylene unit. The content of oxyethylene unit in the polyalkylene unit is generally from 70 to 100 mol %, preferably from 80 to 100 mol %.

Examples of the nonionic emulsifying agent include polyoxyethylene alkyl ethers (e.g., polyoxyethylene $C_{8-24}$ alkyl ethers, preferably polyoxyethylene $C_{10-22}$ alkyl ethers, particularly polyoxyethylene $C_{12-18}$ alkyl ethers, such as polyoxyethylene monooctyl ether, polyoxyethylene monolauryl ether, polyoxyethylene monodecyl ether, polyoxyethylene monocetyl ether, polyoxyethylene monostearyl ether and polyoxyethylene monooleyl ether), polyoxyethylene monoalkylaryl ethers (e.g., polyoxyethylene $C_{8-12}$ alkyl-$C_{6-13}$ aryl ethers, such as polyoxyethylene monooctylphenyl ether, polyoxyethylene monononylphenyl ether and polyoxyethylene monodecylphenyl ether), polyoxyethylene sorbitan higher fatty acid esters (polyoxyethylene sorbitan mono-, di- or tri-$C_{10-24}$ fatty acid esters such as polyoxyethylene sorbitan monolaurate, polyoxyethylene sorbitan monostearate, polyoxyethylene sorbitan monooleate, polyoxyethylene sorbitan distearate and polyoxyethylene sorbitan tristearate) and polyoxyethylene mono-higher fatty acid esters (polyoxyethylene mono-$C_{10-24}$ fatty acid esters such as polyoxyethylene monolauric acid ester and polyoxyethylene monostearic acid ester). These nonionic emulsifying agents may be used alone or as a mixture of two or more.

Examples of preferred nonionic emulsifying agent include polyoxyethylene $C_{8-24}$ alkyl ethers and polyoxyethylene $C_{8-12}$ alkylphenyl ethers.

According to the present invention, (1) a nonionic emulsifying agent having a hydrophile-lipophile balance (HLB) value of 17 or less and containing 15 to 35 ethylene oxide units, particularly (2) a nonionic emulsifying agent comprised of a polyoxyalkylene alkylaryl ether having an HLB value of 17 or less, is used as the aforementioned nonionic emulsifying agent. HLB of the nonionic emulsifying agent is generally from 5 to 17, preferably from 10 to 17, more preferably from about 13 to 17, most preferably from about 15 to 17. The average number of ethylene oxide unit in one molecule of the nonionic emulsifying agent is preferably from 17 to 35, more preferably from about 20 to 35 in average, generally from about 15 to 25.

In this connection, HLB can be calculated by the following formula (1), and, when two or more emulsifying agents are used, it is calculated as the average in weight.

$$HLB=E/5 \tag{1}$$

(In this formula, E means weight fraction of oxyethylene group.)

These emulsifying agents can be used alone or as a mixture of two or more. When two or more emulsifying agents are used, they are selected in such a way that HLB becomes 17 or less. Also, a polyoxyethylene alkyl ether which has an HLB value of larger than 17 and no or low emulsifying action may be jointly used at such a quantitative ratio that HLB becomes 17 or less. When the HLB value exceeds 17, hydrophilic nature of the modified polyisocyanate mixture becomes so high that its emulsification in an aqueous polymer solution or aqueous polymer dispersion requires a high shearing force such as of a mixer or requires a prolonged period of mixing time when the shearing force is low.

Mixing ratio of the aforementioned polyisocyanate and emulsifying agent can be selected within the range of from 0.01 to 0.034 equivalent, preferably from about 0.015 to 0.03 equivalent, of the active hydrogen atom of the emulsifying agent, based on 1 equivalent of isocyanate group in the polyisocyanate. If the ratio of active hydrogen atom of the emulsifying agent per 1 equivalent of isocyanate group is smaller than 0.01, it would cause reduction of emulsifying power and, if larger than 0.034, it would entail so high hydrophilic nature that physical properties such as water resistance would be reduced.

Coupling Agent

In order to increase water resistance of coating membranes by adding the modified polyisocyanate to paints, it is advantageous to allow the aforementioned polyisocyanate to react with a coupling agent. This coupling agent contains a functional group having an active hydrogen atom which is reactive with isocyanate group of the polyisocyanate, such as a mercapto group, an amino group or a carboxyl group. The coupling agent contains a cross-linkable or polymerizable group (e.g., a hydrolysis condensing group). As the hydrolysis condensing group, about 1 to 3 alkoxy groups ($C_{1-14}$ alkoxy groups such as methoxy, ethoxy, propoxy, butoxy and t-butoxy) are contained in one molecule. Typical example of such a coupling agent is a silane coupling agent.

Illustrative examples of the silane coupling agent include a mercapto group-containing silane coupling agent (e.g., a mercapto $C_{2-24}$ alkyltri $C_{1-4}$ alkoxysilane such as β-mercaptoethyltriethoxysilane or γ-mercaptopropyltrimethoxysilane), an amino group-containing silane coupling agent (e.g., an amino $C_{2-4}$ alkyltri $C_{1-4}$ alkoxysilane such as β-aminoethyltrimethoxysilane, β-aminoethyltriethoxysilane, γ-aminopropyltrimethoxysilane or γ-aminopropyltriethoxysilane) and a carboxyl group-containing silane coupling agent (e.g., a carboxyl $C_{2-4}$ alkyltri $C_{1-4}$ alkoxysilane such as β-carboxyethyltrimethoxysilane, γ-carboxypropyltrimethoxysilane or γ-carboxypropyltriethoxysilane). These silane coupling agents can be used alone or as a mixture of two or more.

Preferred example of the coupling agent is a mercapto group-containing silane coupling agent such as γ-mercaptopropyltrimethoxysilane.

Mixing ratio of the aforementioned polyisocyanate and coupling agent can be selected within the range of from 0.01 to 0.3 equivalent, preferably from 0.02 to 0.25 equivalent, more preferably from 0.05 to 0.2 equivalent, of the active hydrogen atom of the coupling agent, based on 1 equivalent of isocyanate group in the polyisocyanate.

Production Process

The modified polyisocyanate of the present invention can be obtained by allowing the aforementioned polyisocyanate, emulsifying agent and, as occasion demands, coupling agent to undergo the reaction while stirring. The reaction temperature can be selected optionally and is generally from about 50 to about 90° C. The reaction time is not particularly limited, too, and is generally from 1 to 24 hours, preferably from about 1 to 8 hours. The reaction may be carried out in the presence of a catalyst (e.g., an amine-based catalyst or tin-based catalyst). Also, the reaction may be carried out in the presence of an inert solvent (non-reactive solvent), but, in order to improve handling ability of an aqueous resin composition while preventing its contamination with an organic solvent, it is desirable to obtain a liquid state modified polyisocyanate having fluidity at room temperature, by carrying out the reaction in the absence of solvent. In this connection, contamination of an aqueous resin composition with organic solvent can be reduced when a hydrophilic or water-soluble solvent non-reactive with isocyanate group is used as the aforementioned inert solvent. Examples of such an organic solvent include ketones such as acetone, ethers such as dioxane and tetrahydrofuran, cellosolve acetates and carbitol acetates such as ethylene glycol monomethyl ether acetate, ethylene glycol monoethyl ether acetate, diethylene glycol ethyl ether acetate and diethylene glycol butyl ether acetate, nitrogen-containing solvents such as N-methylpyrrolidone and N-methylcaprolactam, and mixed solvents thereof.

The content of free isocyanate group in the thus obtained modified polyisocyanate mixture is, for example, from 10 to 25% by weight, preferably from about 11.5 to 21.5% by weight, generally from about 15 to 23% by weight.

In order to obtain a modified polyisocyanate mixture having desired free isocyanate group content, the reaction mixture is sampled with time from the reaction system during the reaction process to measure the isocyanate group content by an amine equivalent method, and the reaction is completed when the desired isocyanate group content is obtained. In a preferred method, a polyisocyanate, an emulsifying agent and a coupling agent if necessary are mixed in advance at such a ratio that the free isocyanate group content of the resulting modified polyisocyanate mixture becomes the aforementioned range, and the reaction is carried out until reaction of each component is completed.

In a preferred mode, the modified polyisocyanate mixture obtained by such a reaction is in a liquid state (or viscous fluid state) having a viscosity (at 23° C.) of for example, from 100 to 10,000 mpa·s, preferably from 200 to 1,000 mPa·s, more preferably from 300 to 800 mPa·s, at 100% by weight solid content, so that it shows fluidity at room temperature. In addition, even at 100% by weight solid content, it shows high emulsifying dispersing ability in an aqueous resin composition (an aqueous resin solution or aqueous resin dispersion). Therefore, it can be added to an aqueous resin composition without its dilution with a solvent, so that the handling can be improved and contamination of the aqueous resin composition with organic solvent can be prevented.

Modified Polyisocyanate Composition

The modified polyisocyanate of the present invention is useful as a curing agent or cross-linking agent for various resins, particularly aqueous resins. Such a curing agent or cross-linking agent may be consisting of the modified polyisocyanate alone, but it is possible to mix the modified polyisocyanate with a coupling agent which is not reactive with isocyanate group (particularly, a silane coupling agent). Examples of such a silane coupling agent include epoxy group- or diglycidyl group-containing silane coupling agents (e.g., γ-glycidoxypropylmethyldiethoxysilane, γ-glycidoxypropyltrimethoxysilane and β-(3,4-epoxycyclohexyl)ethyltrimethoxysilane) and vinyl group-containing silane coupling agents (e.g., vinyltriethoxysilane, vinyltrimethoxysilane, β-(meth) allyloxyethyltrimethoxysilane and γ-(meth) allyloxypropyltrimethoxysilane).

In addition, the modified polyisocyanate mixture of the present invention may contain a solvent which is not reactive with isocyanate group. As such a solvent, various organic solvents can be used, and their examples include esters such as ethyl acetate, butyl acetate, 1-methoxypropyl-2-acetate and propylene glycol diacetate, the aforementioned cellosolve acetates and carbitol acetates, ketones such as acetone, methyl ethyl ketone, methyl isobutyl ketone, 2-butanone, 4-methyl-2-pentanone and cyclohexanone, hydrocarbons such as hexane and toluene, nitrogen-containing solvents such as N-methylpyrrolidone and N-methylcaprolactam, or mixed solvents thereof.

Aqueous Resin Composition

The modified polyisocyanate of the present invention is useful as a curing agent or cross-linking agent of aqueous resin compositions, and aqueous resins contain active hydrogen atoms which are reactive with isocyanate group. Examples of such aqueous resins include various resins having functional groups such as a hydroxyl group, an amino group, a carboxyl group and the like (particularly, a hydroxyl group) having active hydrogen atoms, such as a (meth)acrylic resin having a hydroxyl group-containing monomer unit, a styrene resin having a hydroxyl group-containing monomer unit, a polyvinyl alcohol resin (or a vinyl ester resin such as a vinyl acetate resin), a polyurethane resin, a polyester resin, a polyether resin, a polyamide resin and a cellulose derivative. The aqueous resin may be in the form of either an aqueous solution or dispersion (e.g., an emulsion or micro-emulsion). In addition, the solvent of the aqueous resin composition may be either water alone or a mixed solvent of water with the aforementioned hydrophilic or water-soluble solvent.

Amount of the modified polyisocyanate to be used can be selected optionally depending on the desired characteristics; for example, it can be selected within the range of from 0.2 to 5, preferably from 0.5 to 2, as the equivalent ratio of isocyanate group based on 1 equivalent of the active hydrogen atom of the aforementioned aqueous resin (solid content basis) (isocyanate group/active hydrogen atom).

The modified polyisocyanate of the present invention or a composition thereof is useful in improving resistance (e.g., water resistance, abrasion resistance or toughness) and uniformity of coating films when it is added to various aqueous resin compositions such as aqueous paints, aqueous printing inks, aqueous adhesives and aqueous coating agents. In addition, when such aqueous resin compositions are applied to base materials, uniform and glossy coating films are obtained.

When the polyisocyanate-mixture of the present invention is added to an aqueous resin solution or dispersion, it can be dispersed easily and uniformly within a short period of time without requiring strong agitation power. Because of this, it can be used effectively as a curing agent or cross-linking agent in aqueous resin compositions (e.g., paints, printing inks and adhesives).

Examples of the present invention are given below by way of illustration and not by way of limitation. In this connection, the terms "part" and "%" used in the following Examples and Comparative Examples are weight basis, unless otherwise noted.

Synthesis of Polyisocyanate Mixture A

While stirring at 70° C., a four neck flask equipped with a stirrer, a thermometer and a reflux condenser was charged with 100 parts of an HDI-based isocyanurate group-containing polyisocyanate (trade name: Takenate D-170 HN, manufactured by Takeda Chemical Industries) and 14 parts of polyoxyethylene nonylphenyl ether (20 ethylene oxide EO chain units, HLB: 16.0). Next, the resulting mixture was heated to 80° C. and stirred for 3 hours. By cooling down to room temperature, a substantially colorless and transparent polyisocyanate mixture A was obtained. The isocyanate group content of this polyisocyanate mixture A was 19.8% by weight, and its viscosity was 540 mPa·s (23° C.)

Synthesis of Polyisocyanate Mixture B

A substantially colorless and transparent polyisocyanate mixture B was obtained in the same manner as the case of the synthesis of polyisocyanate mixture A, except that 14 parts of polyoxyethylene nonylphenyl ether (20 EO chain units, HLB: 16.0) and 3 parts of γ-mercaptopropyltrimethoxysilane were used instead of 14 parts of the polyoxyethylene nonylphenyl ether, and additionally 5.8 parts of γ-glycidoxypropyltrimethoxysilane was added after cooling down of the reaction mixture to room temperature. The isocyanate group content of this polyisocyanate mixture B was 17.4% by weight, and its viscosity was 550 mPa·s (23° C.).

Synthesis of Polyisocyanate Mixture C

A polyisocyanate mixture C was obtained in the same manner as the case of the synthesis of polyisocyanate mixture B, except that 14 parts of polyoxyethylene octylphenyl ether (26 EO chain units, HLB: 16.9) was used instead of 14 parts of the polyoxyethylene nonylphenyl ether. The isocyanate group content of this polyisocyanate mixture C was 17.6% by weight, and its viscosity was 540 mPa·s (23° C.).

Synthesis of Polyisocyanate Mixture D

A polyisocyanate mixture D was obtained in the same manner as the case of the synthesis of polyisocyanate mixture B, except that a mixture (HLB: 16.6) consisting of 9 parts of polyoxyethylene nonylphenyl ether (27 EO chain units, HLB: 16.9) and 5 parts of polyoxyethylene nonylphenyl ether (20 EO chain units, HLB: 16.0) was used instead of 14 parts of the polyoxyethylene nonylphenyl ether. The isocyanate group content of this polyisocyanate mixture D was 17.5% by weight, and its viscosity was 610 mPa·s (23° C.).

Synthesis of Polyisocyanate Mixture E

A polyisocyanate mixture E was obtained in the same manner as the case of the synthesis of polyisocyanate mixture B, except that a mixture (HLB: 16.2) of 14 parts of polyoxyethylene nonylphenyl ether (20 EO chain units, HLB: 16.0) and 1 part of polyoxyethylene monomethyl ether (12.5 EO chain units, HLB: 19.5) was used instead of 14 parts of the polyoxyethylene nonylphenyl ether. The isocyanate group content of this polyisocyanate mixture E was 17.2% by weight, and its viscosity was 560 mPa·s (23° C.)

Synthesis of Polyisocyanate Mixture F

A polyisocyanate mixture F was obtained in the same manner as the case of the synthesis of polyisocyanate mixture B, except that 100 parts of an HDI-based allophanate group-containing and isocyanurate group-containing polyisocyanate (trade name: Takenate D-177 N, manufactured by Takeda Chemical Industries) was used instead of 100 parts of the HDI-based isocyanurate group-containing polyisocyanate. The isocyanate group content of this polyisocyanate mixture F was 14.7% by weight, and its viscosity was 400 mpa·s (23° C.).

Synthesis of Polyisocyanate Mixture G

A polyisocyanate mixture G was obtained in the same manner as the case of the synthesis of polyisocyanate mixture B, except that polyoxyethylene monomethyl ether (12.5 EO chain units, HLB: 19.5) was used instead of the polyoxyethylene nonylphenyl ether. The isocyanate group content of this polyisocyanate mixture G was 17.1% by weight, and its viscosity was 500 mPa·s (23° C.).

Production of Acrylic Resin Water Dispersion A

A polymerization vessel equipped with a reflux condenser was charged with 42.00 parts of de-ionized water, 9.00 parts of sodium dioctylsulfosuccinate (trade name: Neocol P, manufactured by Daiichi Kogyo Seiyaku) 1% aqueous solution and 6.00 parts of sodium bicarbonate 1% aqueous solution, and the materials were heated to 70° C. while stirring in a stream of nitrogen. Three parts of methyl methacrylate was added to the mixture and dispersed therein, and then seed polymerization was started by adding 4.50 parts of sodium persulfate 2% aqueous solution. After 30 minutes of stirring at 70° C., 10.00 parts of sodium persulfate 2% aqueous solution was added and then a monomer emulsion comprising the following composition was fed spending 180 minutes.

Monomer emulsion

Methyl methacrylate 55.00 parts

Ethyl acrylate 32.00 parts

2-Hydroxyethyl methacrylate 5.00 parts

Methacrylic acid 3.00 parts 1,4-Butanediol diacrylate 0.50 part

Allyl methacrylate 0.50 part

2-Ethylhexyl thioglycolate 1.00 part

After 60 minutes of stirring at 80° C., this was cooled down to room temperature to obtain an acrylic resin emulsion having a solid content of 40% and containing 21.6 hydroxyl groups per solid (mg KOH/g). This emulsion was neutralized with triethylamine to obtain an acrylic resin water dispersion. This was used as a standard sample for use in the evaluation of modified polyisocyanates.

EXAMPLE 1

Seven parts of the modified polyisocyanate mixture A was added to 100 parts of the aqueous resin dispersion a, the resulting mixture was stirred for 5 seconds by hand using a glass rod to prepare a two liquid mixture in which the modified polyisocyanate mixture A was uniformly dispersed, and then dispersed condition of the modified polyisocyanate was observed with the naked eye. Next, the two liquid mixture was coated on a glass plate using a 10 MIL doctor blade. The thus coated glass plate was cured at 25° C. for 1 week and then soaked in water of 25° C. for 1 week to evaluate transparency and water resistance of the coating film.

EXAMPLES 2 to 6 AND COMPARATIVE EXAMPLE 1

Evaluation of the modified polyisocyanates B to G was carried out in the same manner as described in Example 1.

In this connection, evaluation of dispersibility of resins and transparency and water resistance of coating films was carried out in the following manner.

(1) Dispersibility of modified polyisocyanate

Conditions of mixed solution immediately after mixing the two liquid were evaluated with the naked eye.

O: uniformly dispersed

X: not uniform or partially precipitated (2) Transparency of coating film

Conditions of coating film were evaluated with the naked eye.

O: transparent

X: generation of bloom (3) Water resistance

Conditions of coating film immediately after one week of soaking in water were evaluated with the naked eye.

O: not opaque

X: slightly opaque

The results are shown in Table 1.

TABLE 1

| | Type of Modified Polyisocyanate | Dispersibility | Transparency of Coating Film | Water Resistance |
|---|---|---|---|---|
| Example 1 | A | O | O | O |
| Example 2 | B | O | O | O |
| Example 3 | C | O | O | O |
| Example 4 | D | O | O | O |
| Example 5 | E | O | O | O |
| Example 6 | F | O | O | O |
| Comparative Example 1 | G | X | X | — |

While the invention has been described in detail and with reference to specific embodiments thereof, it will be apparent to one skilled in the art that various changes and modifications can be made therein without departing from the spirit and scope thereof.

This application is based on Japanese patent application No. Hei.-10-120767, filed on Apr. 30, 1998, and incorporated herein by reference.

What is claimed is:

1. A modified polyisocyanate having free isocyanate group in an amount of from 10 to 25% by weight and comprising a reaction product of a polyisocyanate with a nonionic emulsifying agent, said nonionic emulsifying agent comprising (a) an active hydrogen atom reactive with isocyanate group, (b) a hydrophile-lipophile balance (HLB) value of 17 or less and (c) 15 to 35 in average of ethylene oxide units in one molecule.

2. The modified polyisocyanate according to claim 1, wherein the nonionic emulsifying agent is a polyoxyalkylene alkylaryl ether.

3. The modified polyisocyanate according to claim 2, wherein the polyoxyalkylene alkylaryl ether comprises an HLB value of from 5 to 17.

4. A modified polyisocyanate having free isocyanate group in an amount of from 10 to 25% by weight and comprising a reaction product of a polyisocyanate with a nonionic emulsifying agent and a coupling agent, said nonionic emulsifying agent comprising (a) an active hydrogen atom reactive with isocyanate group, (b) a hydrophile-lipophile balance (HLB) value of 17 or less and (c) 15 to 35 in average of ethylene oxide units in one molecule, said coupling agent comprising an active hydrogen atom reactive with isocyanate group and a hydrolysis condensing group.

5. The modified polyisocyanate according to any one of claims 1–4, wherein the polyisocyanate is an aliphatic or alicyclic polyisocyanate, or a derivative of said aliphatic or alicyclic polyisocyanate selected from the group consisting of a dimer, a trimer, a biuret group-containing polyisocyanate, an allophanate group-containing polyisocyanate and an oxadiazinetrione group-containing polyisocyanate, or a combination thereof.

6. The modified polyisocyanate according to claim 5, wherein the polyisocanate is 1,6-diisocyanatohexane or isophorone diisocyanate or a derivative of said 1,6-diisocyanatohexane or isophorone diisocyanate selected from the group consisting of a dimer, a trimer, a biuret group-containing polyisocyanate, an allophanate group-containing polyisocyanate and an oxadiazinetrione group-containing polyisocyanate.

7. The modified polyisocyanate according to claim 4, wherein the nonionic emulsifying agent is a polyoxyalkylene alkylaryl ether.

8. The modified polyisocyanate according to claim 7, wherein the polyoxyalkylene alkylaryl ether comprises an HLB value of from 5 to 17.

9. The modified polyisocyanate according to claim 4, which is obtained by allowing 1 equivalent of isocyanate group in the polyisocyanate to react with from 0.01 to 0.034 equivalent of active hydrogen atom in the nonionic emulsifying agent and from 0.01 to 0.3 equivalent of active hydrogen atom in the coupling agent.

10. The modified polyisocyanate according to claim 4, wherein the coupling agent is a silane coupling agent.

11. The modified polyisocyanate according to claim 10, wherein the silane coupling agent has mercapto group.

12. A process of producing a modified polyisocyanate having free isocyanate group in an amount of from 10 to 25% by weight, which process comprises reacting a polyisocyanate with:

(1) a nonionic emulsifying agent which comprises (a) an active hydrogen atom reactive with isocyanate group, (b) a hydrophile-lipophile balance (HLB) value of 17 or less and (c) 15 to 35 in average of ethylene oxide units in one molecule, (2) a polyoxyalkylene alkylaryl ether which comprises (a) an active hydrogen atom reactive with isocyanate group, (b) an HLB value of from 5 to 17 and (c) ethylene oxide unit, or (3) a nonionic emulsifying agent comprising (a) an active hydrogen atom reactive with isocyanate group and (b) a hydrophile-lipophile balance (HLB) value of 17 or less, and (b) a coupling agent comprising an active hydrogen atom reactive with isocyanato group and a hydrolysis condensing group.

* * * * *